(12) United States Patent
Lee et al.

(10) Patent No.: US 12,392,520 B2
(45) Date of Patent: Aug. 19, 2025

(54) HVAC CONTROL SYSTEM AND METHOD

(71) Applicant: Ambi Labs Limited, Hong Kong (CN)

(72) Inventors: Shang Hsin Julian Lee, Hong Kong (CN); Martin Raphael Pierre Noel Boissier, Hong Kong (CN)

(73) Assignee: Ambi Labs Limited, Hong Kong (CN)

( * ) Notice: Subject to any disclaimer, the term of this patent is extended or adjusted under 35 U.S.C. 154(b) by 485 days.

(21) Appl. No.: 17/767,609

(22) PCT Filed: Oct. 9, 2020

(86) PCT No.: PCT/CN2020/119923
§ 371 (c)(1),
(2) Date: Apr. 8, 2022

(87) PCT Pub. No.: WO2021/068882
PCT Pub. Date: Apr. 15, 2021

(65) Prior Publication Data
US 2023/0134772 A1 May 4, 2023

(30) Foreign Application Priority Data
Oct. 8, 2019 (HK) .................................. 19130534.1

(51) Int. Cl.
*F24F 11/63* (2018.01)
*F24F 11/50* (2018.01)
(Continued)

(52) U.S. Cl.
CPC .............. *F24F 11/63* (2018.01); *F24F 11/50* (2018.01); *F24F 11/56* (2018.01); *G05B 19/042* (2013.01);
(Continued)

(58) Field of Classification Search
CPC .. F24F 11/63; F24F 11/50; F24F 11/56; F24F 2110/10; F24F 2110/20; F24F 2120/10;
(Continued)

(56) References Cited

U.S. PATENT DOCUMENTS

2015/0219356 A1* 8/2015 Ito ...................... G05D 23/1904
165/266
2016/0320081 A1* 11/2016 Nikovski ............ G06F 16/2228
(Continued)

FOREIGN PATENT DOCUMENTS

CN 103398451 A 11/2013
CN 105091202 A 11/2015
(Continued)

OTHER PUBLICATIONS

World Intellectual Property Organization, International Search Report and Written Opinion for international application No. PCT/CN2020/119923, mail date Jan. 13, 2021, 11 total pages.

*Primary Examiner* — Charles Cai
(74) *Attorney, Agent, or Firm* — SoCal IP Law Group LLP; Mark A. Goldstein

(57) ABSTRACT

A HVAC control system comprising a user interface adapted to receive comfort feedback from a user. A processor is adapted to receive the comfort feedback and input data corresponding to one or more comfort factors and respective values of the comfort factors. The processor is adapted to build a comfort model for the user based on the comfort feedback and the input data, with the comfort model correlating a comfort score to one or more values of one or more of the comfort factors. The processor is configured to adjust one or more functions of an HVAC unit to vary one or more comfort factors such that a predetermined comfort score is achieved. An associated method and an associated system are also provided.

16 Claims, 8 Drawing Sheets

(51) Int. Cl.
*F24F 11/56* (2018.01)
*F24F 110/10* (2018.01)
*F24F 110/20* (2018.01)
*F24F 120/20* (2018.01)
*F24F 140/60* (2018.01)
*G05B 19/042* (2006.01)
*F24F 120/10* (2018.01)
*F24F 130/20* (2018.01)
*F24F 130/30* (2018.01)

(52) U.S. Cl.
CPC ....... *F24F 2110/10* (2018.01); *F24F 2110/20* (2018.01); *F24F 2120/10* (2018.01); *F24F 2120/20* (2018.01); *F24F 2130/20* (2018.01); *F24F 2130/30* (2018.01); *F24F 2140/60* (2018.01); *G05B 2219/2614* (2013.01)

(58) Field of Classification Search
CPC ............... F24F 2120/20; F24F 2130/20; F24F 2130/30; F24F 2140/60; F24F 11/64; F24F 11/57; F24F 11/70; G05B 19/042; G05B 2219/2614

See application file for complete search history.

(56) References Cited

U.S. PATENT DOCUMENTS

2017/0292726 A1* 10/2017 Sato .................. F24F 11/72
2018/0202677 A1* 7/2018 Endel .................. G05B 19/042
2018/0204162 A1 7/2018 Endel et al.
2019/0219297 A1* 7/2019 Annaamalai ............. F24F 11/64
2020/0134891 A1* 4/2020 Ohta .................. F24F 11/523
2021/0064011 A1* 3/2021 Gyota .................. H04L 67/12

FOREIGN PATENT DOCUMENTS

CN 105571048 A 5/2016
CN 108613332 A 10/2018
WO 2021068882 A1 4/2021

* cited by examiner

Fig. 6

HVAC CONTROL SYSTEM AND METHOD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/CN2020/119923, filed Oct. 9, 2020, entitled, "HVAC CONTROL SYSTEM AND METHOD", which claims priority to Hong Kong Patent Application No. 19130534.1, filed Oct. 8, 2019, all of which are incorporated herein by reference in their entirety.

BACKGROUND

Electrical power utilities and power grid system operators face the common issue of the total electrical load varying significantly over time. As power grids have fixed maximal capacities, contingencies threaten the supply-demand balance, and while excess electrical power can be stored, a peak demand load could lead to power outages. Power utilities thus face the issue of implementing peak load curtailment.

Although residential customers typically only make up a small (15-30%) of total electricity consumption, at the system peak, residential electricity consumption can contribute over 50% of total electricity consumption. Much of this residential electricity consumption is driven by air conditioner usage, with air conditioners driving over 50% of residential electricity demand during peak times.

Traditionally, load management has been done using variable pricing regimes. For example, the price of energy is higher during fixed periods of time where the peak load is likely to happen. The problem is that it is not as predictable as utilities would like. These price incentives do not provide any curtailment guarantees or direct control over the load.

More recently, the advent of smart grids has enabled direct load control through automated demand response (ADR or DR) programs. In particular, ADR programs can be used to reduce consumer demand during peak periods by communicating directly with the consumers' electrical appliances that are part of the smart grid and controlling their energy consumption.

As heating, ventilation, and air conditioning (HVAC) systems represent a major part of grid load, most ADR programs target direct control of air conditioners and their energy consumption.

Basic ADR programs work by cycling appliances on and off and more advanced programs work by modulation of the temperature setting (usually a fixed set point, or a fixed offset of the current set point). Cycling can be achieved using a load control switch but adjustments in HVAC operational set point requires that the HVAC is programmable and connected to the smart grid.

While power utilities have achieved better load control through ADR programs, consumers are still able to freely opt out and leave the programs at any time. One reason for this is the coarse adjustments mandated by these programs. For example, mandating a blanket offset of the current set point or a particular on and off cycle for all users will inevitably lead to a number of users opting out. This limits the success and effectiveness of these ADR programs.

Residential ADR programs targeting air conditioning equipment have been trialed in several countries, with programs in the US seeing the most extensive rollout. These ADR trials have been extensively studied, with a sample of such studies listed in Table 1 below.

TABLE 1

Sample of ADR trial studies.

| Source | Sample Size | DR Regime | Extent | Opt-out Rate |
|---|---|---|---|---|
| National Grid 2017 | 1,782 | Offset Temp | +3 F. | 15% |
| Navigant, 2015-2016 | 10,301 | Offset Temp | +3-4 F. | 2% |
| Navigant, 2015 | 1,047 | Offset Temp | +0-3 F. | 20-30% |
| KEMA, 2006 | 3,936 | Offset Temp | +4 F. | 20% |
| Wang, Swisher & Stewart, 2005 | 1,600 | Offset Temp | +4 F. | 20% |
| Agnew, Goldberg, & Rubin, 2004 | 202 | Offset Temp | +3-5 F. | 20-47% |
| Egan-Annechino, 2005 | 100 | Duty Cycle | 50% | 27% |

As illustrated in the sample above, a key issue found in studies relating to these ADR trials is the relatively high opt-out rate (typically between 20-30%). The opt-out rate is typically affected by several factors, including:
 i. outdoor weather conditions (estimated to be a 3.6% increase per 1° F.);
 ii. day of the week (3.6% higher on Thursdays vs Wednesdays);
 iii. DR Event Duration (3.3% higher per additional hour);
 iv. incentives structure.

Analysis by KEMA in 2010 suggests that the key reason for opt-out is related to user thermal discomfort. Based on a survey of DR program participants who opted out, 68% of users indicated that the primary reason they opted-out was due to thermal discomfort issues.

Another related problem is the difficulty in determining how to control and adjust HVAC systems to satisfy a user, especially a number of users. In particular, it is difficult to determine the required set points for HVAC units in order to achieve the performance required to satisfy users.

It is an object of the present invention to overcome or ameliorate at least one of the disadvantages of the prior art, or to provide a useful alternative.

SUMMARY

Embodiments of the present invention in a first aspect provide a HVAC control system comprising: a user interface adapted to receive comfort feedback from a user; and a processor adapted to receive the comfort feedback and input data corresponding to one or more comfort factors and respective values of the comfort factors, the processor adapted to build a comfort model for the user based on the comfort feedback and the input data, the comfort model correlating a comfort score to one or more values of one or more of the comfort factors, and the processor adjusting one or more functions of an HVAC unit to vary one or more comfort factors such that a predetermined comfort score is achieved.

Embodiments of the present invention in a second aspect provide a method of controlling a HVAC unit, the method comprising: receiving comfort feedback from a user; receiving input data corresponding to one or more comfort factors and respective values of the comfort factors; using a processor to build a comfort model for the user based on the comfort feedback and the input data, the comfort model correlating a comfort score to one or more values of one or more of the comfort factors; and using a processor to adjust one or more functions of an HVAC unit to vary one or more comfort factors such that a predetermined comfort score is achieved.

Other features and embodiments of the present invention can be found in the appended claims.

Throughout this specification, including the claims, the words "comprise", "comprising", and other like terms are to be construed in an inclusive sense, that is, in the sense of "including, but not limited to", and not in an exclusive or exhaustive sense, unless explicitly stated otherwise or the context clearly requires otherwise.

BRIEF DESCRIPTION OF THE FIGURES

Preferred embodiments in accordance with the best mode of the present invention will now be described, by way of example only, with reference to the accompanying figures, in which the same reference numerals refer to like parts throughout the figures unless otherwise specified, and in which:

FIG. 6 is an infographic of a fixed temperature offset DR program showing the relative satisfaction of users to fixed temperature offsets;

DETAILED DESCRIPTION

Figure 1:
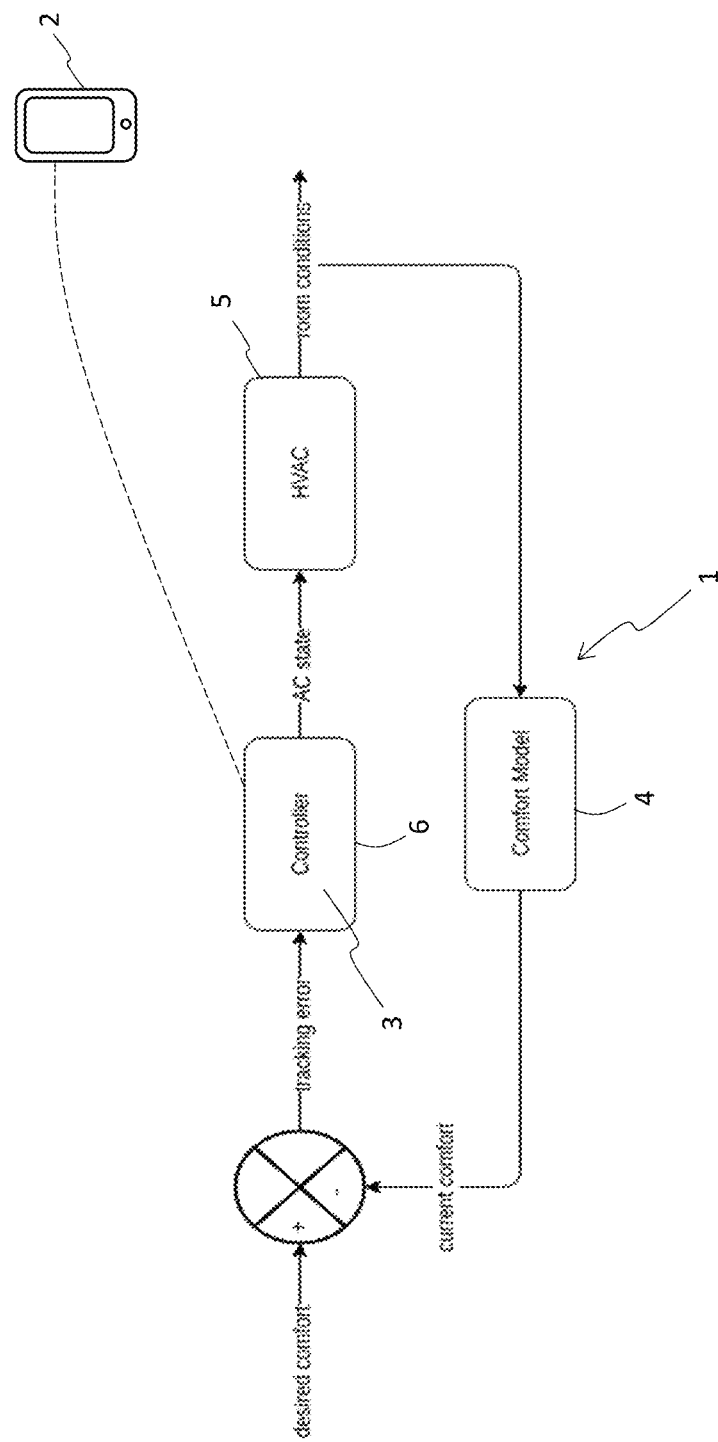
FIG. 1 is a schematic of a HVAC control system in accordance with an embodiment of the present invention.

Referring to the figures, there is provided a HVAC control system 1 comprising a user interface 2 adapted to receive comfort feedback from a user. A processor 3 is adapted to receive the comfort feedback and input data corresponding to one or more comfort factors and respective values of the comfort factors. The processor 3 is adapted to build a comfort model 4 for the user based on the comfort feedback and the input data, with the comfort model 4 correlating a comfort score to one or more values of one or more of the comfort factors. The processor 3 adjusts one or more functions of an HVAC unit 5 to vary one or more comfort factors such that a predetermined comfort score is achieved. A HVAC unit 5 is a heating, ventilation, air conditioning unit, or any other appliance that alters or leads to an alteration in a comfort factor or any other environmental condition that affects a comfort factor.

In the embodiment shown in the figures, the processor 3 can form part of a controller 6 for adjusting the one or more functions of the HVAC unit 5. For example, the controller 6 can be in the form of a standalone controller unit that adjusts the functions of the HVAC unit 5 by sending infrared signals to an infrared receiver on the HVAC unit 5. The infrared receiver can be the same infrared receiver that normally receives infrared signals from a handheld remote control.

In another embodiment, the processor 3 can form part of a server that is located remotely from the controller. The server and therefore the processor 3 are connected to the controller 6 through a communication network which can be a wireless communication network. For examples, typical communication protocols are cellular, Wi-Fi, and Bluetooth.

In other embodiments, the processor 3 is located on one or more of the following: a local server; a remote server (as described above); a cloud server; a smartphone; a laptop computer; and a desktop computer. The processor 3 can be more than one physical processor and can therefore be located in multiple locations. This allows for redundancy, where alternate physical processors can be used in case one or more are unavailable, or for more processing power.

In other embodiments, one or more user interfaces 2 are adapted to receive comfort feedback from a plurality of users. The processor 3 is adapted to build a respective comfort model 4 for each respective user based on both the comfort feedback and the input data in respect of the respective user. The respective comfort model 4 correlates a respective comfort score for the respective user to one or more values of one or more of the comfort factors affecting the respective user. The processor 3 adjusts one or more functions of one or more of the HVAC units 5 to vary one or more comfort factors such that a respective predetermined comfort score for each respective user is achieved.

Where one or more of the HVAC units 5 corresponds to a respective plurality of users, the processor 3 adjusts one or more functions of each HVAC unit 5 to vary one or more comfort factors such that a respective average predetermined comfort score for the respective plurality of users is achieved.

For example, in a multi-room building with each room serviced by one HVAC unit 5, if there is only one user per room, the processor 3 adjusts one or more functions of the HVAC unit 5 servicing each room to vary one or more comfort factors such that the predetermined comfort score for the user in that room is achieved. If there is more than one user in a room, then the processor 3 adjusts one or more functions of the HVAC unit 5 servicing that room to vary one or more comfort factors such that the average of the predetermined comfort scores for the users in that room is achieved.

The comfort model 4 is built for each user and as such is personalised for that user based on the comfort feedback from that user and on the input data in respect of that user which corresponds to the one or more comfort factors affecting that user and respective values of these comfort factors. The comfort model 4 is a machine learning regression model, or any other model based on an artificial intelligence or machine learning algorithm.

The comfort model 4 can be implemented by the processor 3 with or without the assistance of a memory unit associated with the processor. The memory unit can be connected locally to the processor 3. For example, where the processor 3 forms part of the controller 6, the memory unit can also be located in the controller 6. Alternatively, the memory unit can be located remotely in, for example, a remote server. The memory unit can also be more than one physical memory unit and can therefore be located in multiple locations. This allows for redundancy, where alternate physical memory units can be used in case one or more are unavailable, or for more memory space.

The memory unit also records the input data which corresponds to one or more comfort factors and respective values of the comfort factors. The input data can be either or both of currently received input data or historic input data received in the past. The comfort factors can be one or more of the following: temperature; humidity; luminosity; time of day; occupancy; user identifier; and any other factor that affects the comfort of a user. The user identifier can be used to identify a particular user so that the comfort model 4 for that particular user can be identified and used by the HVAC control system 1. The input data can be provided via one or more sensors. For example, the sensors can comprise one or more of the following: temperature sensor; humidity sensor; luminosity sensor; movement sensor; and access control sensor.

The comfort feedback can be in the form of a descriptive phrase. Advantageously, this means the HVAC control system 1 is easy to use for all types of users. The descriptive phrase can be in the form of a comfort opinion, and advantageously need not be in the form of a metric or number such as a temperature setting. For example, the descriptive phrase can be: "hot", "cold", "warm", "cool", "comfortable", "humid", or "dry". Any natural language descriptor for a comfort factor or environmental condition can be used.

The comfort score is a discrete or continuous numerical range. For example, the comfort score can be a discrete numerical range such as the integers between and including −3 and 3. Alternatively, the comfort score can be a continuous numerical range such as the real numbers between and including −3 and 3. A continuous numerical range has the advantage that comfort scores can be of any degree of accuracy. For example, one discrete numerical range is the following:

+3 . . . hot
+2 . . . too warm
+1 . . . a bit warm
0 . . . comfortable
−1 . . . a bit cold
−2 . . . too cold
−3 . . . freezing One continuous numerical range is the numbers listed in the above discrete numerical ranges as well as all the real numbers in between. This means that for example a comfort score of 0.5 can be assigned which is halfway between "comfortable" and "a bit warm". As another example, a comfort score of −2.5 means halfway between "too cold" and "freezing". The comfort score is calculated by the comfort model 4. Using a numerical range provides a simple and consistent indication of the comfort level for the particular user regardless of the way the comfort feedback is expressed by the user. As discussed above, the comfort feedback can be expressed as a descriptive phrase or natural language descriptor, which is much easier and natural for a user to use.

Each predetermined comfort score can be a comfort score within a predetermined comfort offset range. That is, instead of a single numerical value, the predetermined comfort score can be a range of comfort scores defined by an offset range. This provides the HVAC control system 1 with some flexibility to achieve predetermined comfort scores, especially if there is a limitation on the system, such as a power abatement instruction as discussed further below. In the example above, the comfort score is a number in the continuous numerical range of between −3 to 3. A predetermined comfort score can be 0. However, a comfort offset range can be used. For example, a predetermined comfort offset range can be +0.5 which means that the predetermined comfort score is any number between 0 and +0.5. The predetermined comfort score is simply a comfort score that has been preselected, e.g., as a target or a threshold. The predetermined comfort offset range is simply a comfort offset range that has been preselected, e.g., as a target or a threshold. The predetermined comfort offset range and comfort offset range can also be referred to as the predetermined comfort offset and comfort offset, respectively, for brevity.

In the present embodiments, the processor 3 is adapted to receive a power abatement instruction from a power utility. The processor 3 adjusts one or more functions of one or more of the HVAC units 5 to vary one or more comfort factors such that one or more of the predetermined comfort scores is achieved whilst complying with the power abatement instruction.

A power abatement instruction can be one that is issued under an automated demand response (ADR or DR) program. ADR programs can be used to reduce consumer demand during peak periods by communicating directly with the consumers' electrical appliances that are part of the smart grid and controlling their energy consumption. Such communication includes a power abatement instruction, which is also referred to as a DR event or DR trigger. Basic ADR programs work by issuing a power abatement instruction instructing the HVAC units or systems subscribed to the ADR program to cycle the HVAC units on and off, and more advanced programs work by issuing a power abatement instruction to modulate the temperature setting. This modulation of the temperature setting is usually in the form of a fixed set point, or a fixed offset of the current set point.

However, since embodiments of the present invention are based on achieving comfort scores instead of a fixed temperature set point or a fixed offset of the current set point, a power abatement instruction based on a fixed temperature set point or a fixed offset of the current set point can still be complied with at the same time as achieving a comfort score. This is because a comfort score is correlated to one or more values of one or more of the comfort factors. This means that a range of temperatures can be correlated with the same comfort score. This could be because a user is not very sensitive to certain temperature ranges. Alternatively, a range of temperatures combined with other values of comfort factors can be correlated with the same comfort score. For example, a change in temperature combined with a change of luminosity or humidity could result in no discernible change in comfort from a user and therefore correlates with the same comfort score. As a result, a predetermined comfort score for a user can be achieved whilst still complying with a power abatement instruction based on a fixed temperature set point or a fixed offset of the current set point.

Where the predetermined comfort score is a comfort score within a predetermined comfort offset range, this of course provides more flexibility in achieving the predetermined comfort score (i.e., a comfort score within a predetermined comfort offset range) whilst still complying with a power abatement instruction, such as one based on a fixed temperature set point or a fixed offset of the current set point.

In some embodiments, the present invention considers that the power abatement instruction corresponds to a power abatement value, and the power abatement instruction is complied with when the power abatement value is achieved over a predetermined time period.

To do this, the processor 3 computes a mapping between, for example, a fixed set point offset (provided by a power abatement instruction) and a corresponding comfort score (either a single comfort score or a comfort offset range) which would on average over a predetermined time period correspond to the fixed set point offset. One particular way of doing this is to use the processor 3 to simulate which state the HVAC unit 5 would be deployed as a hypothetical comfort score is varied. At any given point in time, a set point can then be computed which would be deployed for a given comfort score. By considering the difference between this hypothetical set point and the actual set point deployed, a set point offset corresponding to the given comfort score can be inferred. By averaging the set point offset over the predetermined time period and performing a grid search for different comfort scores, the mapping referred to above can then be obtained.

In other embodiments, the present invention considers that the power abatement instruction corresponds to a total power abatement value across a plurality of the HVAC units, and the power abatement instruction for each user is complied with when the total power abatement value is achieved.

To do this, the processor 3 computes a mapping between, for example, a fixed set point offset (provided by a power abatement instruction) and a corresponding comfort score (either a single comfort score or a comfort offset range) which would on average over a plurality of users correspond to the fixed set point offset. One particular way of doing this is to use the processor 3 to simulate which state the HVAC unit 5 would be deployed as a hypothetical comfort score is varied. At any given point in time for a given number of users, a set point can then be computed which would be deployed for a given comfort score. By considering the difference between this hypothetical set point and the actual set point deployed, a set point offset corresponding to the given comfort score can be inferred. By averaging the set point offset over a number of users in a time period and performing a grid search for different comfort scores, the mapping referred to above can then be obtained.

The examples above are based on the power abatement instruction being a temperature set point offset for each HVAC unit. However, the same principles and similar calculations can be made for other types of power abatement instructions.

The one or more functions of the HVAC unit 5 adjusted by the processor 3 can be any function that varies or leads to a variation in one or more of the comfort factors. Typically, the functions of the HVAC unit 5 being adjusted are one or more of the following: temperature setting; mode; fan speed; humidity setting; and on/off setting. In one embodiment, the functions of the HVAC unit 5 being adjusted are those that are usually adjusted by a user manually or through a remote control. For example, the functions can be those that are normally adjusted using infrared signals from a remote control operated by a user. In this case, the HVAC control system includes the controller 6 that is adapted to send infrared signals to the HVAC unit 5, thereby taking the place of the remote control. Advantageously, this allows the HVAC control system 1 to be retrofitted to an existing HVAC unit 5. If there are multiple HVAC units 5, there can be multiple controllers 6, one for each HVAC unit 5. In this case, there can be multiple processors 3, one for each HVAC unit 5, or there can be one processor 3 which controls all the HVAC units 5 separately. In another embodiment, the functions of the HVAC unit 5 being adjusted include those that are not normally adjustable by a user. For example, the processor 3 can control the power supply for the HVAC unit 5. In this case, the HVAC unit 5 can include an integrated control unit which is connected to or in communication with the processor 3.

Typically, the user interface 2 is in the form of a software application. The user interface 2 can be implemented on one or more of the following: a personal device; a smartphone; a laptop computer; a desktop computer; and a terminal. For example, the user interface 2 can be an app downloadable onto a smartphone. In this case, the processor 3 can be the smartphone under the direction of the app. Alternatively, the processor 3 can be on another device, such as the controller 6 or a remote server, and the user interface 2 in the form of an app communicates with the processor 3. Communication can be through a cellular network, Wi-Fi, Bluetooth, or any other communication protocol.

In another aspect, the present invention provides embodiments of a method of controlling a HVAC unit. In one embodiment, the method comprises: receiving comfort feedback from a user; receiving input data corresponding to one or more comfort factors and respective values of the comfort factors; using a processor 3 to build a comfort model 4 for the user based on the comfort feedback and the input data, the comfort model correlating a comfort score to one or more values of one or more of the comfort factors; and using a processor 3 to adjust one or more functions of an HVAC unit 5 to vary one or more comfort factors such that a predetermined comfort score is achieved.

In other embodiments of the method, the comfort feedback is received from a plurality of users. A respective comfort model 4 is built for each respective user based on both the comfort feedback and the input data in respect of the respective user. The respective comfort model 4 correlates a respective comfort score for the respective user to one or more values of one or more of the comfort factors affecting the respective user. One or more functions of one or more of the HVAC units 5 is adjusted to vary one or more comfort factors such that a respective predetermined comfort score for each respective user is achieved.

In further embodiments, the method comprises receiving a power abatement instruction from a power utility, and using a processor 3 to adjust one or more functions of one or more of the HVAC units 5 to vary one or more comfort factors such that one or more of the predetermined comfort scores is achieved whilst complying with the power abatement instruction.

Other embodiments and features of the method are clear from the foregoing description, especially in relation to the HVAC control system 1.

Embodiments of the present invention are particularly advantageous for use with ADR programs which issue power abatement instructions, also known as DR events or DR triggers, in order to curtail power consumption. The power abatement instructions are issued by the power utility to directly control appliances such as HVAC units 5 or to mandate an operational limitation. Such power abatement instructions include a fixed temperature set point or a fixed temperature set point offset (i.e., a fixed offset of the current set point) for each HVAC unit 5.

Figure 6:
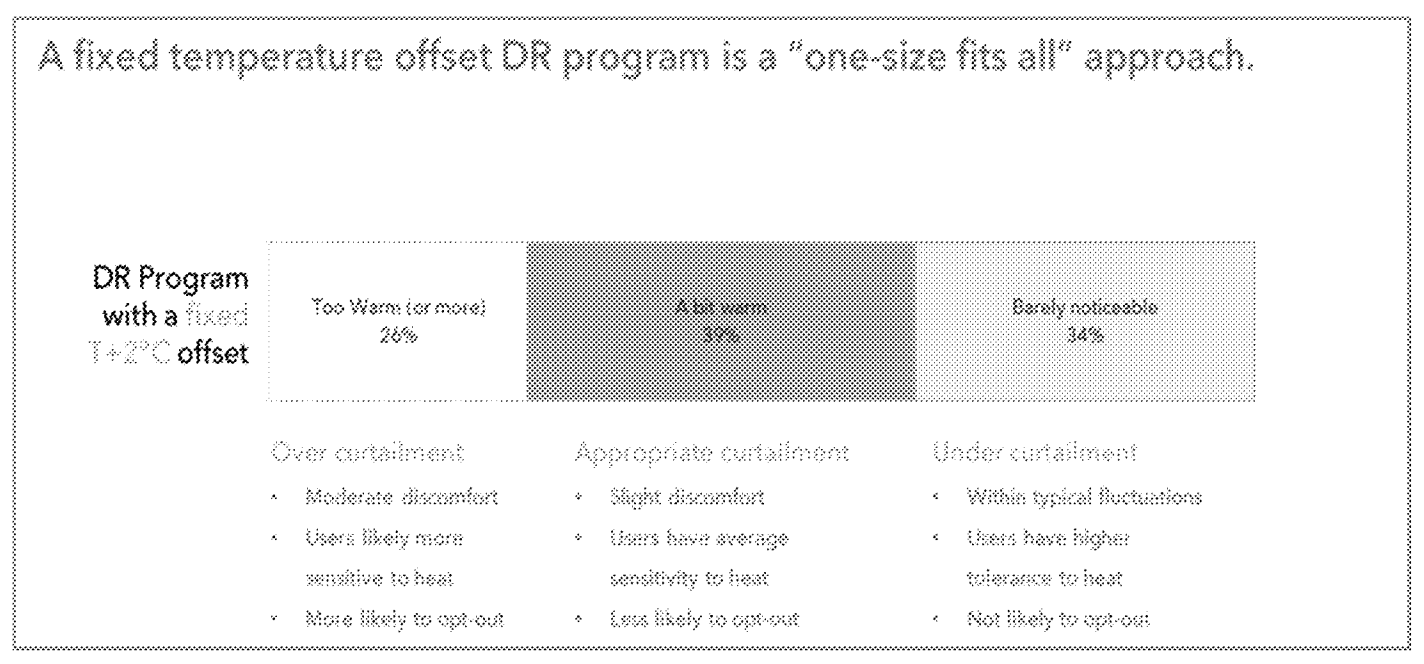

The inventors have performed an analysis of the impact of a 2° C. temperature offset on the comfort level (thermal comfort) of users. As best shown in FIG. 6, the analysis reveals that approximately 26% of users would find a +2° C. temperature offset "too warm", which corresponds closely with the empirically observed opt-out rate from previous studies. Based on their comfort profiles, it is believed that these users are likely more sensitive to thermal discomfort, and may also be more sensitive to other non-temperature thermal comfort factors, such as humidity, or may have homes with poorer insulation or higher exposure to thermal radiation.

Of the remaining 74% of users, the inventors' analysis and comfort models predict that 39% of them would be "a bit warm", which is believed to be an appropriate level of curtailment. However, there is a further 34% of users for whom the inventors' analysis and comfort models predict that the users would only find the conditions marginally warmer (and may only barely notice the difference). This would imply that these users are under-curtailed, and that there is an opportunity to further increase the temperature offset without causing them undue discomfort.

Instead of using a typical fixed "one-size-fits-all" temperature offset, embodiments of the present invention create a custom curtailment level for each user based on knowledge of users' personal comfort preferences. As described above, this is done by building a comfort model 4 for each user based on both the comfort feedback and the input data in respect of that user, with the comfort model 4 correlating a comfort score for that user to one or more values of one or more of the comfort factors affecting that user.

Figure 7:
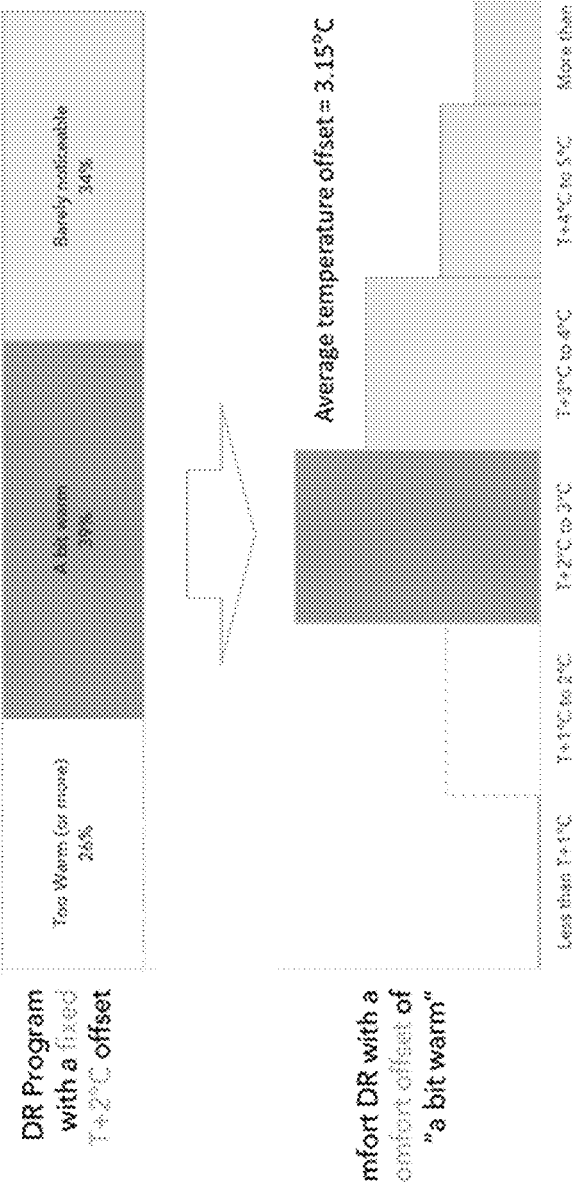
FIG. 7 is an infographic of a fixed temperature offset DR program showing the relative satisfaction of users to fixed temperature offsets compared with using comfort offsets in accordance with embodiments of the present invention.
Figure 8:
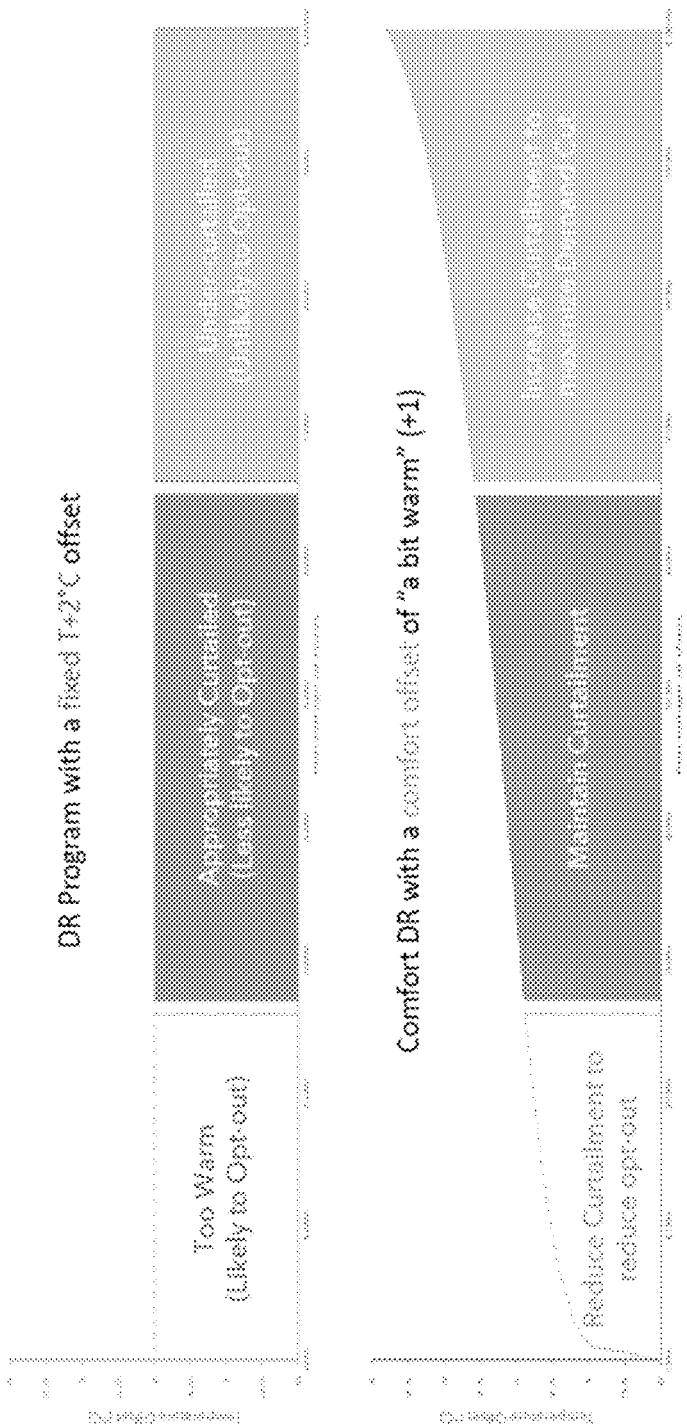
FIG. 8 is an infographic of a fixed temperature offset DR program showing the relative satisfaction of users to fixed temperature offsets compared with the relative satisfaction of users to comfort offsets in accordance with embodiments of the present invention.

Under such a regime, the temperature offset is reduced for the segment that is more sensitive to heat (i.e., those predicted to be "too warm" in the analysis described above). The +2° C. offset is maintained for the 39% of users who are appropriately curtailed, and the temperature offset is increased for the users who would be able to maintain comfort at the higher temperatures. FIGS. 7 and 8 show this distribution of temperature offsets using the comfort models 4 in accordance with embodiments of the present invention. By implementing DR events based on comfort models 4 rather than fixed cycling rates and fixed offsets or set points, the opt-out rate can be better controlled and the power curtailment or abatement can be maximised or better managed. The HVAC control system 1 according to embodiments of the present invention directly controls HVAC energy consumption by dynamically adjusting the set point of HVAC units and other consumer appliances based on comfort levels and comfort models 4.

The comfort model 4 can be trained in a supervised fashion and learns to generalise from comfort feedback (e.g., the seven-point scale "freezing" to "hot" described above) provided by the user through the user interface 2.

After the training, the comfort model 4 is able to predict how comfortable a user would feel given some specific comfort factors. The comfort model 4 outputs a continuous comfort score ranging from −3 ("freezing") to 3 ("hot") where 0 denotes "comfortable", which is the continuous counterpart of the discrete seven-point comfort feedback scale used by the user.

Two different users can feel different under the same room conditions. This is reflected by the comfort predictions provided by the comfort model 4. A user identifier can be part of the comfort factors so that this can be associated with the user's individual comfort model 4, with the comfort model 4 providing personalised comfort output.

Figure 3:
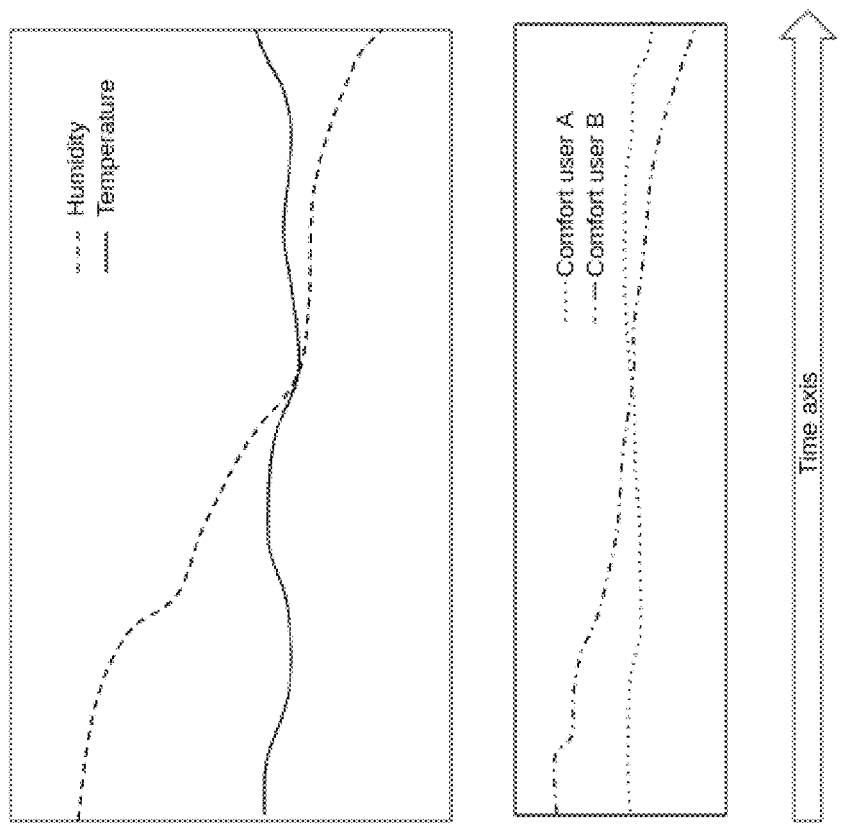
FIG. 3 is a graph of the comfort levels experienced by different users as temperature and humidity vary over time.

For instance, in the case of a User A being more sensitive to humidity than a User B, under the same room conditions, the comfort model 4 provides personalised comfort predictions reflecting the user's thermal preferences. This is best shown in FIG. 3.

In one embodiment, in order to determine which state for the HVAC unit 5 to deploy, the processor 3 or the controller 6 operates as a closed feedback loop controller. The controller is constantly adjusting the HVAC setting (power, mode, set temperature) in order to minimise a tracking error.

In the case of a thermostat, a generic controller would try to minimise the difference between a desired room temperature and the current room temperature.

In embodiments of the present invention, the goal is not to maintain a room temperature but to adjust the HVAC setting (or other functions) in such a way that the room conditions are comfortable for the user (according to the comfort model 4). To do so, the processor 3 or controller 6 minimises a tracking error based on the user's comfort: the difference between the desired comfort level (0 for "comfortable") and the current comfort level of a given user (which is obtained from the comfort model 4). This is best shown in FIG. 1.

During a power abatement instruction (i.e., a DR event or DR trigger), the goal is to leverage the comfort model and the processor 3 to control the HVAC unit 5 to reach a specific comfort level.

The comfort score (including a single comfort score or a comfort offset range) associated with the current DR event is used to compute the desired comfort score which is then fed to the processor 3. This will allow the processor 3 to deploy a higher set point than usual which will in turn lead to reduced energy consumption whilst still maintaining the comfort score for the user or a comfort score within the comfort offset range (e.g., +0.5 comfort offset).

When compared to a traditional implementation of a DR event with a fixed offset, comfort variability is sacrificed for set point variability, that is, a temperature offset is deployed the users, the offset is fixed in space (same for all users) but also fixed in time (does not change over the course of the event), which results in large variations in the users' comfort which in turn lead to opt out.

Figure 4:
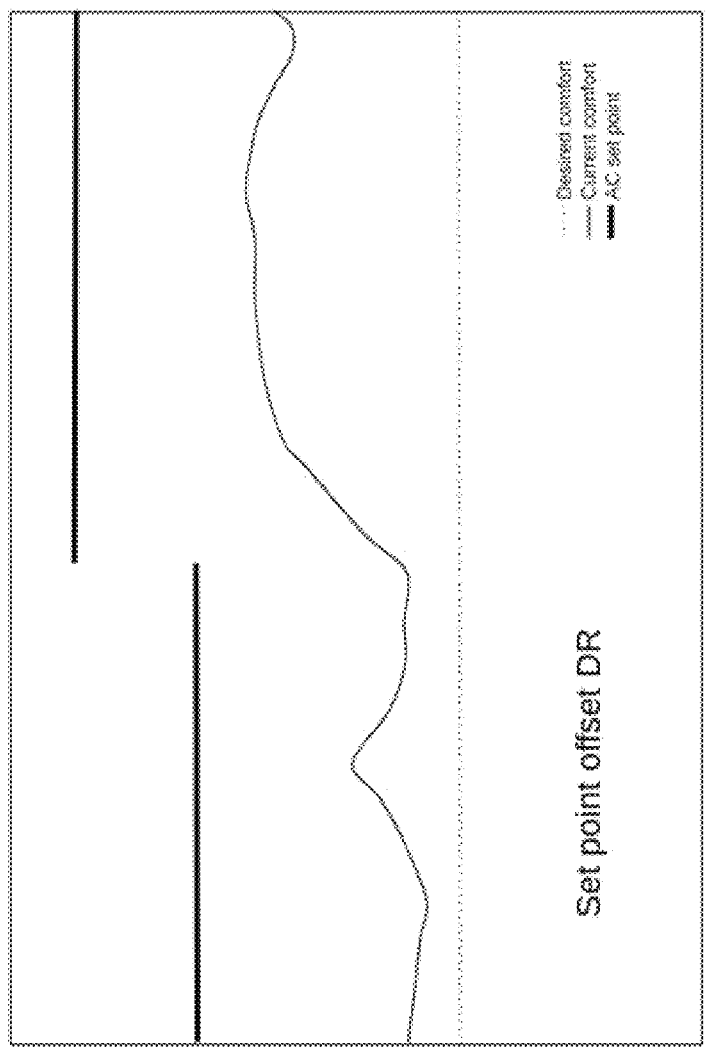
FIG. 4 is a graph of the actual current comfort level and the desired comfort level of a user compared with the set point of an AC unit during a DR event.
Figure 5:
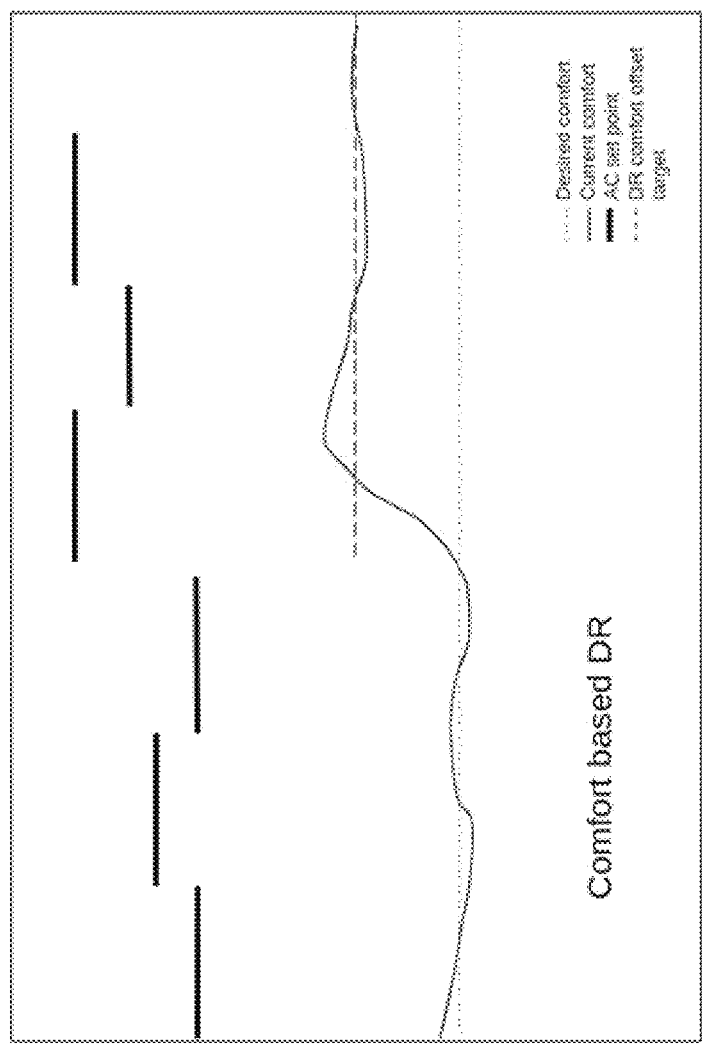
FIG. 5 is a graph of the actual current comfort level and the desired comfort level of a user compared with the set point of an AC unit and a comfort offset during a DR event, with the comfort offset being in accordance with an embodiment of the present invention.

By contrast, by using embodiments of the present invention based on a comfort model 4, a comfort score or comfort offset range is applied to users, with the score or offset being fixed in space and time, resulting in users' comfort being stable and at a similar level throughout the DR event. The resulting deployed set point offset varies throughout space and time to provide a personalised comfort but also to compensate for constant variations of the comfort factors. This is best shown in FIGS. 4 and 5.

Traditional implementations of a DR event are characterised by a fixed set temperature offset, whereas embodiments of the present invention implement DR events based on comfort scores (including a single comfort score or a comfort score within a predetermined comfort offset range) based on comfort models 4. In one embodiment, the HVAC control system 1 computes a mapping between a fixed set point offset and the corresponding comfort score or offset that would on average (over space and time) correspond to a similar or same set point offset.

Figure 2:
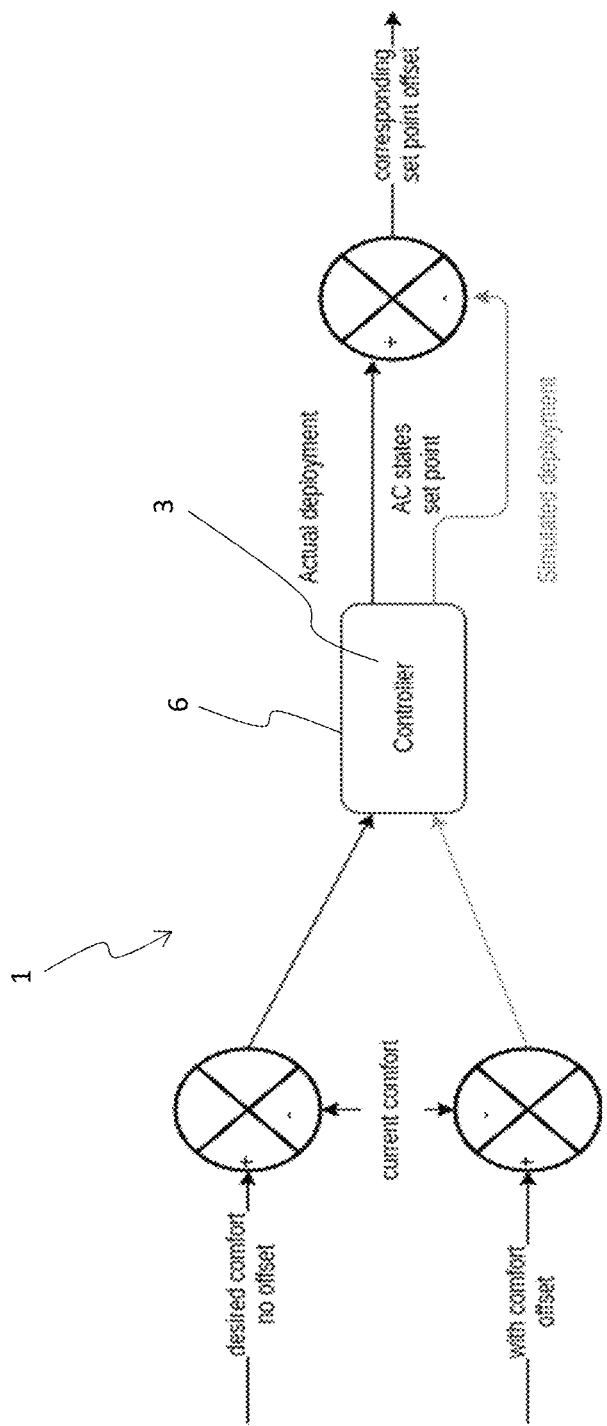
FIG. 2 is a schematic of a HVAC control system in accordance with another embodiment of the present invention.

To do so, the processor 3 is used to simulate which state of the HVAC unit would be deployed as we vary a hypothetical comfort score or offset. At any given point in time for a given number of users, a set point can therefore be computed that would be deployed for a given comfort score or offset. By considering the difference between this hypothetical set point and the actual set point deployed a set point offset corresponding to the given comfort score or offset can be inferred. See FIG. 2.

By averaging the set point offset over a period of time and a number of users and performing a grid search for different comfort score or offset values the mapping referred to above can be obtained.

The example below shows a mapping between comfort offset ranges and set point offsets.

| comfort-offset | setpoint-offset |
| --- | --- |
| 0.1 | 0.18 |
| 0.2 | 0.42 |
| 0.3 | 0.69 |
| 0.4 | 0.99 |
| 0.5 | 1.31 |

It is also appreciated that the aforesaid embodiments are only exemplary embodiments adopted to describe the principles of the present invention, and the present invention is not merely limited thereto. Various variants and modifications can be made by those of ordinary skill in the art without departing from the spirit and essence of the present invention, and these variants and modifications are also covered within the scope of the present invention. Accordingly, although the invention has been described with reference to specific examples, it is appreciated by those skilled in the art that the invention can be embodied in many other forms. It is also appreciated by those skilled in the art that the features of the various examples described can be combined in other combinations.

The invention claimed is:

1. A HVAC control system comprising:
at least one user interface adapted to receive comfort feedback from a plurality of users; and
a processor adapted to receive the comfort feedback and input data corresponding to one or more comfort factors and respective values of the comfort factors, the processor adapted to build a respective comfort model for each respective user based on both the comfort feedback and the input data in respect of the respective user, the respective comfort model correlating a respective comfort score for the respective user to one or more values of one or more of the comfort factors affecting the respective user, and the processor adjusting one or more functions of one or more HVAC units to vary one or more of the comfort factors such that a respective predetermined comfort score for each respective user is achieved;
wherein the processor is adapted to receive a power abatement instruction from a power utility, the processor adjusting one or more functions of one or more of the HVAC units to vary one or more comfort factors such that one or more of the predetermined comfort scores is achieved while complying with the power abatement instruction, wherein the power abatement instruction corresponds to a total power abatement value across a plurality of the HVAC units, and the power abatement instruction for each user of the plurality of users is complied with when the total power abatement value is achieved, and wherein one or more of the comfort models is a machine learning regression model.

2. The HVAC control system according to claim 1 wherein one or more of the HVAC units corresponds to a respective plurality of users and the processor adjusts one or more functions of each HVAC unit to vary one or more comfort factors such that a respective average predetermined comfort score for the respective plurality of users is achieved.

3. The HVAC control system according to claim 1 wherein each predetermined comfort score is a comfort score within a predetermined comfort offset range.

4. The HVAC system according to claim 1 wherein the power abatement instruction corresponds to a power abatement value, and the power abatement instruction is complied with when the power abatement value is achieved over a predetermined time period.

5. The HVAC system according to claim 1 wherein the power abatement instruction is a temperature set point offset for each HVAC unit.

6. The HVAC control system according to claim 1 wherein the comfort factors are one or more selected from the group including: temperature; humidity; luminosity; time of day; occupancy; or user identifier.

7. The HVAC control system according to claim 1 wherein the comfort feedback is in the form of a descriptive phrase.

8. The HVAC control system according to claim 1 wherein the comfort score is a discrete or continuous numerical range.

9. The HVAC control system according to claim 1 wherein the user interface is in the form of a software application.

10. The HVAC control system according to claim 1 wherein the user interface is implemented on one or more of the following: a personal device; a smartphone; a laptop computer; a desktop computer; or a terminal.

11. The HVAC control system according to claim 1 wherein the processor is located on one or more of the following: a local server; a remote server; a cloud server; a smartphone; a laptop computer; or a desktop computer.

12. The HVAC control system according to claim 1 wherein the input data is provided via one or more sensors.

13. The HVAC control system according to claim 12 wherein the sensors comprise one or more selected from the group including: temperature sensor; humidity sensor; luminosity sensor; movement sensor; or access control sensor.

14. A method of controlling one or more HVAC units, the method comprising:
receiving comfort feedback from a plurality of users;
receiving input data corresponding to one or more comfort factors and respective values of the comfort factors;
using a processor to build a respective comfort model for each respective user based on both the comfort feedback and the input data in respect of the respective user, the respective comfort model correlating a respective comfort score for the respective user to one or more values of one or more of the comfort factors affecting the respective user;
using the processor to adjust one or more functions of one or more of the HVAC units to vary one or more comfort factors such that one or more of the predetermined comfort scores is while complying with the power abatement instruction;
wherein the power abatement instruction corresponds to a total power abatement value across a plurality of the HVAC units, and the power abatement instruction for each user is complied with when the total power abatement value is achieved, and wherein one or more of the respective comfort models is a machine learning regression model.

15. The method according to claim 14 wherein:
comfort feedback is received from a plurality of users;
each respective comfort model is built for each respective user based on both the comfort feedback and the input data in respect of the respective user, the respective comfort model correlating a respective comfort score for the respective user to one or more values of one or more of the comfort factors affecting the respective user; and
one or more functions of one or more of the HVAC units is adjusted to vary one or more comfort factors such that a respective predetermined comfort score for each respective user is achieved.

16. The method according to claim 14 further comprising receiving a power abatement instruction from a power utility, and using the processor to adjust one or more functions of one or more of the HVAC units to vary one or more comfort factors such that one or more of the predetermined comfort scores is achieved whilst complying with the power abatement instruction.

* * * * *